(12) United States Patent
Carlson et al.

(10) Patent No.: US 6,349,198 B1
(45) Date of Patent: Feb. 19, 2002

(54) WIRELESS CONTROL SYSTEM FOR PERIODIC NOISE SOURCES

(75) Inventors: Grant B. Carlson, Pittsford; Mark P. Hinman, Holley, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/490,514

(22) Filed: Jan. 25, 2000

(51) Int. Cl.[7] .............................. H04Q 7/20; H04Q 7/32
(52) U.S. Cl. ..................... 455/63; 455/67.5; 455/66; 455/67.1; 455/295; 455/296; 455/67.3; 455/298; 455/299; 375/346
(58) Field of Search ..................... 455/63, 67.1, 67.5, 455/310, 303, 304, 67.3, 403, 88, 66, 295, 296, 298, 299, 550, 517; 375/346

(56) References Cited

U.S. PATENT DOCUMENTS

| | | | |
|---|---|---|---|
| 5,574,979 A | 11/1996 | West ............................ 455/63 |
| 5,745,479 A * | 4/1998 | Burns et al. ................ 455/67.1 |
| 6,006,071 A * | 12/1999 | Roberts et al. ................ 455/63 |
| 6,175,860 B1 * | 1/2001 | Gaucher ....................... 455/63 |

* cited by examiner

Primary Examiner—William Trost
Assistant Examiner—Keith Ferguson
(74) Attorney, Agent, or Firm—Thomas H. Close

(57) ABSTRACT

A wireless control system for use in system having a plurality of periodic noise sources includes an antenna; an RF receiver connected to the antenna for receiving RF noise from an external periodic noise source; a phase synchronization circuit connected to the RF receiver for generating a clock signal that is in phase with the external periodic noise; and a noise source control circuit connected to the phase synchronization circuit for receiving the clock signal and controlling a periodic noise source, whereby the periodic noise sources in the system are synchronized to emit their periodic noise in phase with each other.

9 Claims, 3 Drawing Sheets

US 6,349,198 B1

WIRELESS CONTROL SYSTEM FOR PERIODIC NOISE SOURCES

FIELD OF THE INVENTION

This invention relates to control of the RF emissions generated by Magnetron tubes or solid state devices as generally deployed in microwave ovens and electrode-less sulfur lighting structures both operating primarily in the 2.4 to 2.5 GHz ISM band.

BACKGROUND OF THE INVENTION

Magnetron tubes by way of their intended operation are a primary source of incoherent RF noise. Used in lighting structures and worldwide in over more than 200 million microwave ovens, magnetrons generate a great deal of RF noise in the 2.4 to 2.5 GHz ISM band. They are by far the greatest and most significant source of noise in this band.

The RF noise generated presents a problem for wireless communication systems that also occupy the 2.4 to 2.5 GHz ISM Band. Wireless communication devices use this ISM band particularly because the band is unlicensed and available internationally. Although magnetrons can and do operate in other bands, for the purpose of describing the present invention, references will only be made to the RF noise generated by magnetrons as is present in the 2.4 to 2.5 GHz ISM band. It will be understood that the same principles can be used regardless of the band of operation.

Radio frequency (RF) transmissions in the 2.4 to 2.5 GHz ISM Band have historically had to deal with the presence of man-made noise from microwave ovens. The noise emanates from the oven by leakage through the enclosure of the oven. The leakage noise is periodic and has a radiated output power approximately 20 dB greater in strength than that allowed by the FCC for operation of Part 15 non spread spectrum radios. Most recently, lighting structures are being introduced that incorporate multiple magnetrons operating continuously on all three phases of the AC power grid. The application of these lighting structures present significant interference to wireless communication links at separations of nearly a half mile.

There are several well known ways to perform wireless communication in the presence of an operating magnetron and one of those ways is to use spread spectrum techniques. One type of spread spectrum technique used by wireless communication links is called direct sequence. Direct sequence spreads the communication signal over a band which is much larger than the bandwidth of the information signal so that the narrow band noise from the noise source has a reduced effect on the demodulated signal to noise ratio. This technique however is relatively expensive to implement, and does not work well if the receiver is located very close to the noise source. Another way to communicate in the presence in the presence of magnetron noise as found in microwave ovens is described in U.S. Pat. No. 5,574,979, issued Nov. 12, 1996 to West, entitled "Periodic Interference Avoidance in a Wireless Radio Frequency Communication System". This patent demonstrates a potential solution by avoiding microwave oven periodic noise by sensing the periodicity of the AC power line main in which the oven is connected to. Unfortunately this technique does not work for periodic noise sources other than microwave ovens or in cases where multiple magnetron noise sources exist operating on different AC phases. When the microwave sources operate on different AC phases, there are no gaps left to communicate in using the technique disclosed by West.

Therefore an improvement is needed when the presence of multiple magnetrons operating simultaneously on different phases exist in the same environment and frequency band with wireless communication devices.

SUMMARY OF THE INVENTION

This need is met according to the present invention by providing a wireless control system for use in a system having a plurality of periodic noise sources. The control system includes an antenna; an RF receiver connected to the antenna for receiving RF noise from an external periodic noise source; a phase synchronization circuit connected to the RF receiver for generating a clock signal that is in phase with the external periodic noise; and a noise source control circuit connected to the phase synchronization circuit for receiving the clock signal and controlling a periodic noise source, whereby the periodic noise sources in the system are synchronized to emit their periodic noise in phase with each other.

The present invention has the advantage that RF communication can occur during the quiescent periods of the synchronized periodic noise.

DETAILED DESCRIPTION OF THE INVENTION

Figure 1:
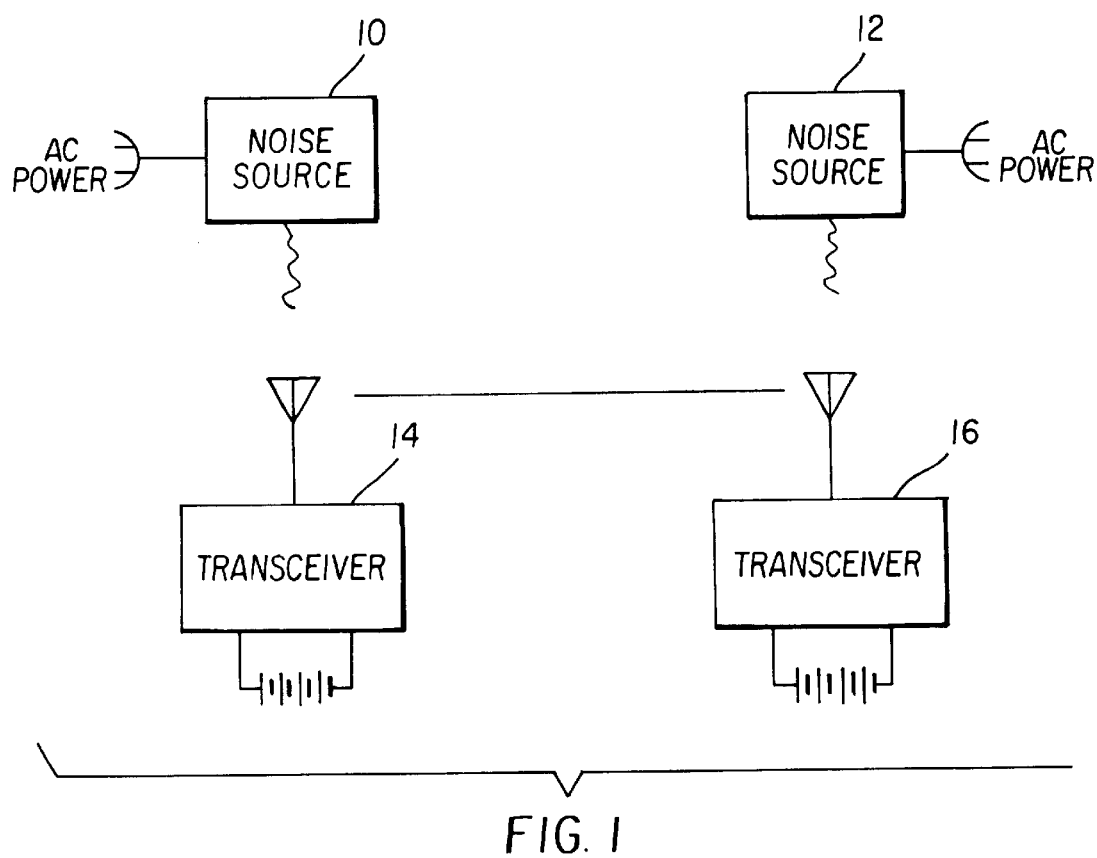
FIG. 1 is a simplified block diagram of a system having a plurality of periodic noise sources operating simultaneously in the presence of a wireless communication link.

Referring to FIG. 1, a system in which the present invention is employed includes a plurality of noise sources 10 and 12 and a battery powered wireless communication link consisting of two transceivers 14 and 16. The transceivers are attempting to operate in the same environment with the noise sources and are provided with detectors for detecting the periodic noise from the noise sources and means for operating the transceivers in the quiescent periods between noise bursts. This can be provided for example by the circuit described by West, or preferably by the technique described in U.S. patent application Ser. No. 09/392,881, filed Sep. 9, 1999, entitled "RF Wireless Communication System Operating in Periodic Noise Environments," which is a continuation of U.S. Ser. No. 09/089,204, filed Jun. 2, 1998, the disclosure of which is incorporated herein by reference.

The noise sources emit periodic noise that disturbs the operation of the wireless communication link. In addressing this problem, it is understood that the periodic noise energy emitted from the noise sources is based on the frequency of the AC power line that provides power to the noise sources. For a magnetron driven device the output noise spectrum is pulsed at approximately a 50% duty cycle and synchronized in phase to the applied AC line voltage. The frequency of the periodic noise signal is usually 50 or 60 Hertz for trans-type magnetron systems and 100 or 120 Hz for switching type systems.

Figure 2:
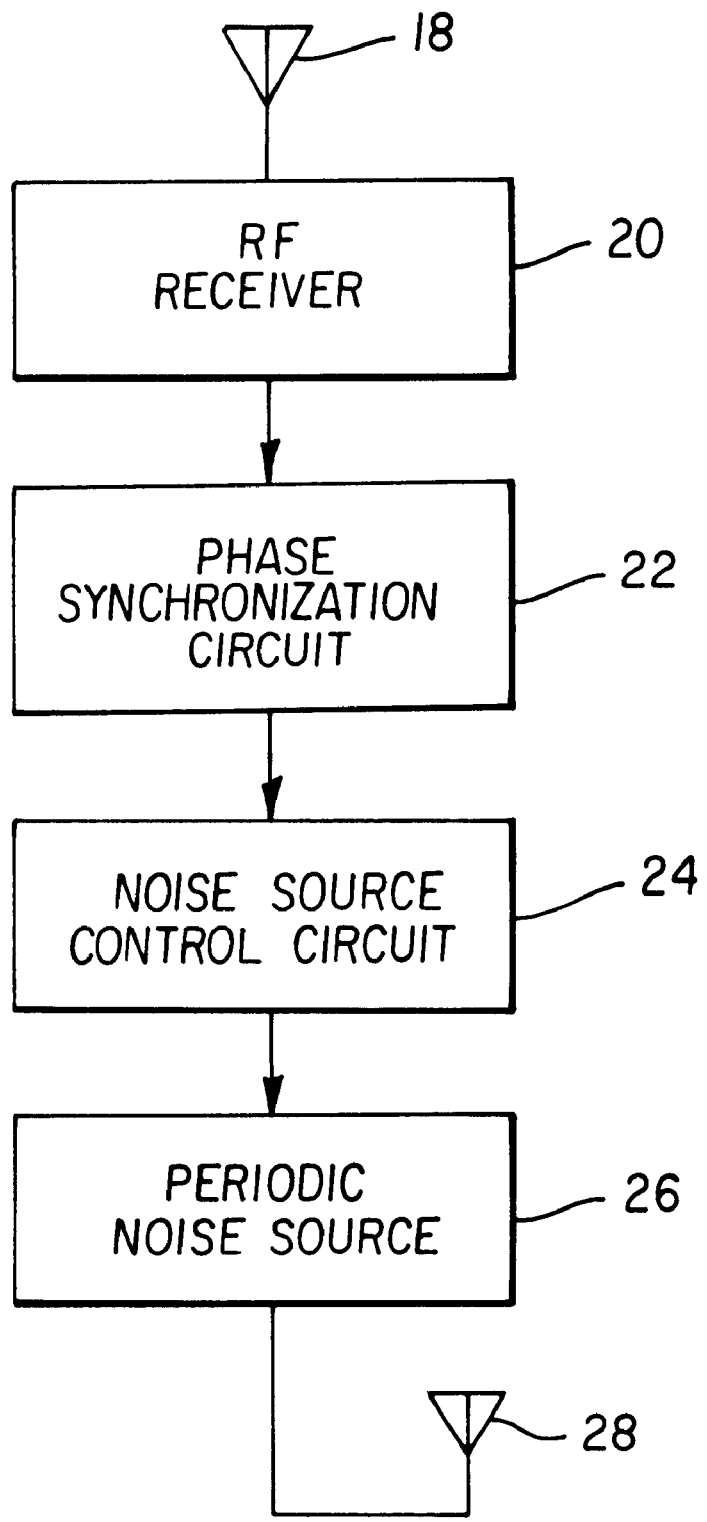
FIG. 2 is a block diagram of the apparatus of the present invention.

According to the present invention, a wireless control system is mounted in every periodic noise source and is shown in FIG. 2. The wireless control system has contained within it an RF receiver 20 connected to an antenna 18 used to receive and detect all RF noise with the receiver's passband. The receiver's passband is set in such a way that the receiver can detect both the pulsed noise emitted by the noise sources and the RF transmissions emitted by the wireless communication link.

The output of the receiver 20 drives a phase synchronization circuit 22 which synchronizes a clock that drives the noise source control circuit 24. The noise source control circuit 24 then turns the noise source 26 on and off in sync with the output of the RF receiver. The periodic noise source is connected to its own transmitting antenna 28.

All RF receivers 20 operating within a local environment will receive the same pulsed periodic noise pattern as emitted by the plurality of noise sources. By synchronizing all periodic noise sources in phase with each other, the wireless communication links can communicate during the quiescent periods around the RF noise pulses. The quiescent periods occur when all the periodic noise sources are off.

Figure 3:
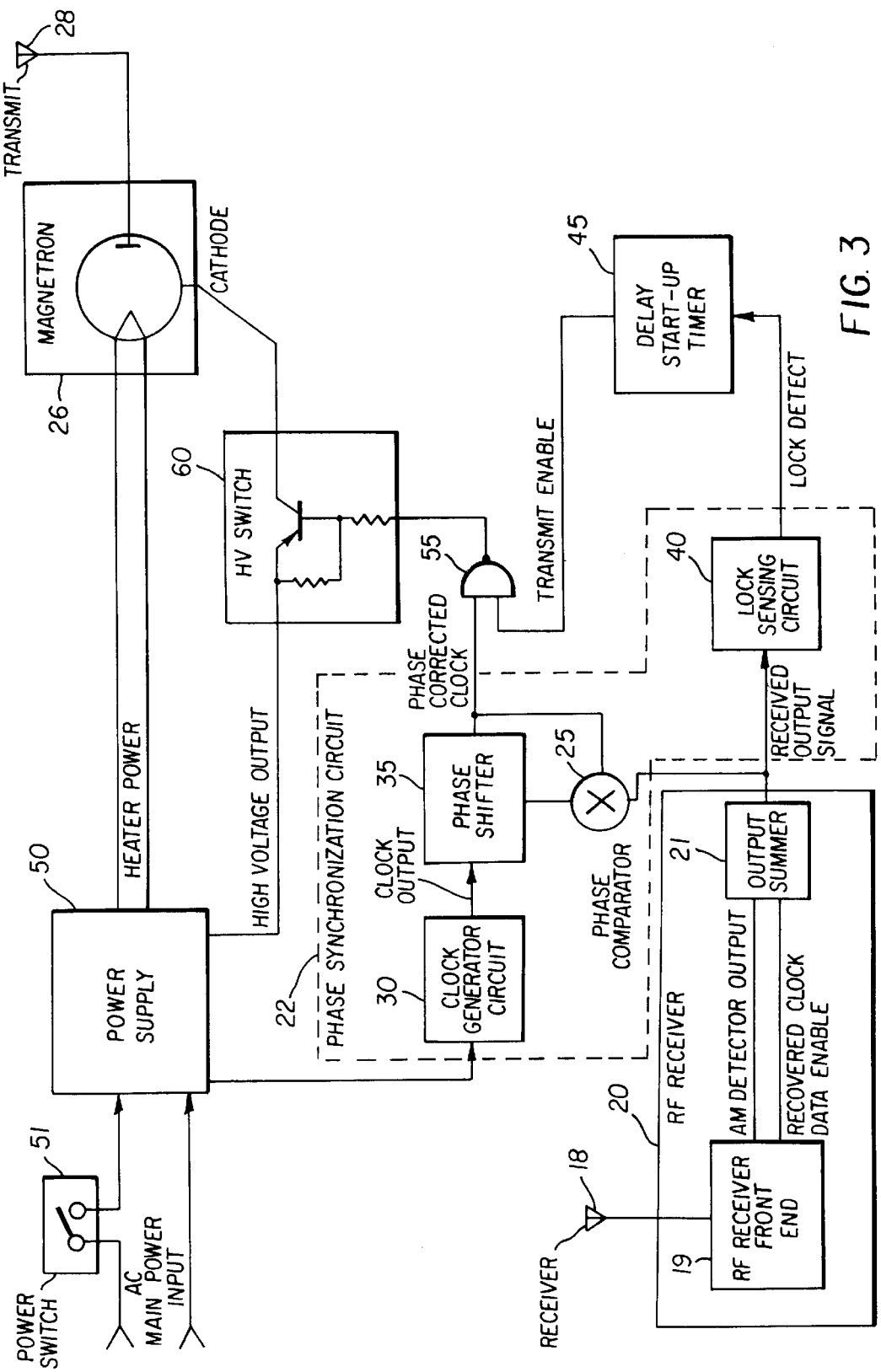
FIG. 3 is a detailed block diagram of a preferred embodiment of the present invention.

A more detailed block diagram of the wireless control circuit is shown in FIG. 3. Here the phase synchronization circuit 22 is further broken down into a clock generator 30, a phase shifter 35, a phase comparator 25 and a lock sensing circuit 40. Similar in operation to any phase lock loop the output of the phase comparator 25 controls the amount of phase shift applied to the clock as the clock passes through the phase shifter circuit 35. The output of the phase shifter circuit is a phase corrected clock that is in sync with the summed output of the RF receiver.

The RF receiver is broken further down into two parts the RF receiver front end 19 and its output summer 21. The RF receiver front end 19 is a standard design 2.4 to 2.5 GHz receiver with the capability of demodulating an AM signal as well as other signals like, FSK or QPSK. An FSK demodulator in the receiver is for example a Motorola MC13155 integrated circuit. The output summer 21 is a standard summing circuit that is used to sum the AM detected signal with the recovered clock data enable of an FSK or QPSK transmission. The output of the summer 21 is the received output signal that represents the appropriate feedback signal required to provide synchronization. The output provides a synchronization signal even when the transceivers are operating in the quiescent periods between the noise pulses.

The RF receiver uses a standard AM detector. The clock generator 30 is used to derive a clock in sync with the AC line voltage applied to power the periodic noise source. The clock generator monitors the line voltage that is fed into the main power supply 50 and produces a clock signal that is in phase with the main line frequency. The power supply 50 is of standard AC to DC design and is activated by a power switch 51. The power switch 51 for a lighting structure could be a optical sensor switch that senses the amount of sunlight. The output of the clock generator circuit 30 is then fed into the phase shifter 35. The output of the-phase shifter 35 is a phase corrected clock that is in phase with the received output signal of the output summer 21.

The phase corrected clock is then used to drive a control switch 60 which is used to turn on and off the periodic noise source which is shown as a magnetron 26. In the case of a magnetron noise source, the control switch 60 is a standard high voltage transistor. An AND gate 55 is used to enable the control switch 60 depending upon the length of delay determined by a delay start up timer circuit 45. Each control circuit has a unique value for the amount of delay to startup such that no two sources in an environment can startup at the same time. After the delay has expired the transmit enable signal is generated.

A lock sensing circuit 40 receives the output signal from the output summer 21 and generates a lock detect if the received output signal has the same frequency as the AC power main. The lock detect signal is supplied to the delay start up timer and overrides the delay start up timer to generate the transmit enable signal. This results in enabling all of the noise sources immediately once one of them has started and a lock detect signal has been generated.

The invention has been described in detail with particular reference to certain preferred embodiments thereof, but it will be understood that variations and modifications can be effected within the spirit and scope of the invention.

PARTS LIST 10 periodic noise source
12 periodic noise source
14 RF transceiver
16 RF transceiver
18 receive antenna
19 RF receiver front end
20 RF receiver
21 output summer circuit
22 phase synchronization circuit
24 noise source control circuit
25 phase comparator
26 periodic noise source—a magnetron
28 transmit antenna
30 clock generator circuit
35 phase shifter
40 lock sensing circuit
45 delay start up circuit
50 power supply
51 power switch
55 AND gate
60 high voltage transistor control switch

What is claimed is:

1. A wireless control apparatus for use in a system having a plurality of periodic noise sources, comprising:

a) an antenna;

b) an RF receiver connected to the antenna for receiving RF noise from an external periodic noise source;

c) a phase synchronization circuit connected to the RF receiver for generating a clock signal that is in phase with the external periodic noise; and d) a noise source control circuit connected to the phase synchronization circuit for receiving the clock signal and controlling an internal periodic noise source, whereby the periodic noise sources in the system are synchronized to emit their periodic noise in phase with each other.

2. The apparatus claimed in claim 1, wherein the periodic noise sources are magnetrons emitting in the 2.4–2.5 GHz ISM band.

3. The apparatus claimed in claim 2, wherein the system is a lighting system.

4. The apparatus claimed in claim 2, wherein the system includes a plurality of microwave ovens.

5. A method of controlling a system having a plurality of periodic noise sources, comprising the steps of:

a) sensing RF noise from an external periodic noise source;

b) generating a clock signal that is in phase with the external periodic noise; and c) using the clock signal to control an internal periodic noise source, whereby the periodic noise sources in the system are synchronized to emit their periodic noise in phase with each other.

6. The method claimed in claim 5, further comprising the step of transmitting and receiving radio signals during quiescent periods in the periodic noise.

7. The method claimed in claim 5, wherein the periodic noise sources are magnetrons emitting in the 2.4–2.5 GHz ISM band.

8. The method claimed in claim 7, wherein the system is a lighting system.

9. The method claimed in claim 7, wherein the system includes a plurality of microwave ovens.

\* \* \* \* \*